G. E. TOWNSEND.
RAKE.
APPLICATION FILED MAR. 18, 1914.
1,142,127.
Patented June 8, 1915.
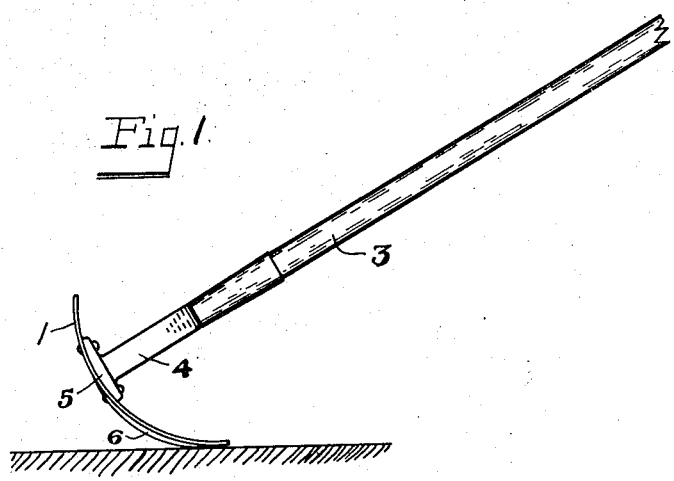
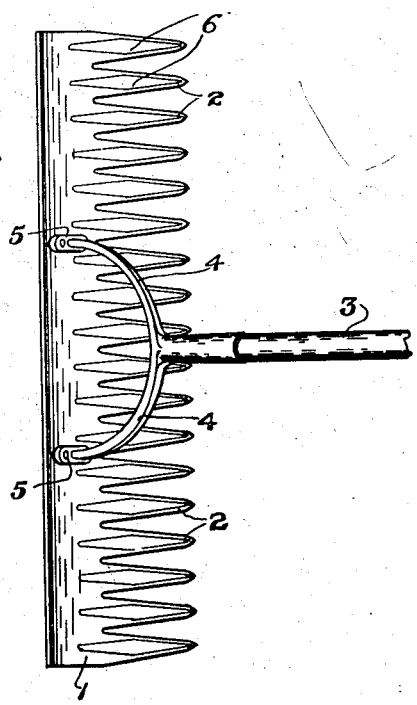
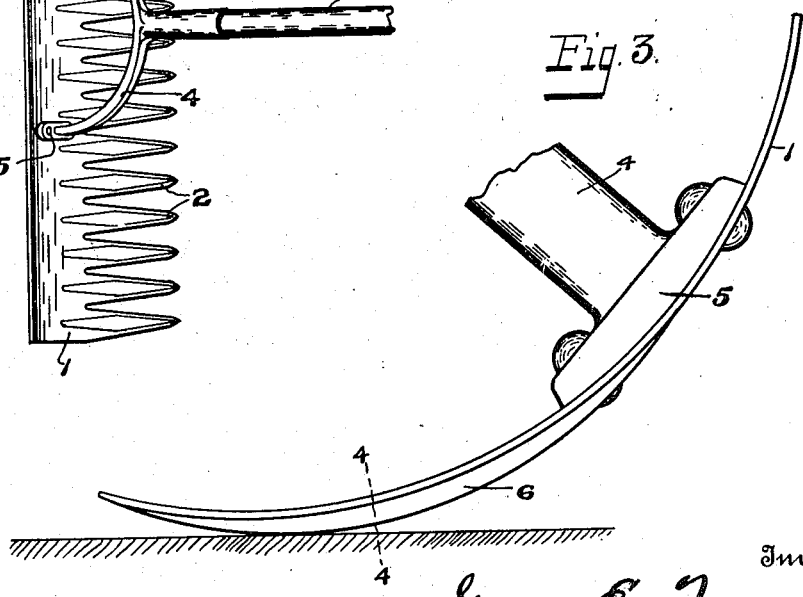
Witnesses
Ladru E. Collier
Chas. I. Welch
Inventor
George E. Townsend
By Staley Bowman
Attorney

UNITED STATES PATENT OFFICE.

GEORGE E. TOWNSEND, OF SPRINGFIELD, OHIO.

RAKE.

1,142,127. Specification of Letters Patent. Patented June 8, 1915.

Application filed March 18, 1914. Serial No. 825,487.

*To all whom it may concern:*

Be it known that I, GEORGE E. TOWNSEND, a citizen of the United States, residing at Springfield, in the county of Clark and State of Ohio, have invented certain new and useful Improvements in Rakes, of which the following is a specification.

My invention relates to improvements in rakes particularly adapted for use on lawns.

The object of the invention is to provide a rake for the purpose of clearing the lawn from weeds, such as dandelions, without the danger of injuring the growing grass.

A further object is to provide a rake for the purpose referred to which will be simple in construction, cheap to manufacture and effective in use.

In the accompanying drawings,—Figure 1 is a side elevation of a rake embodying the improvements, the handle being shown broken away. Fig. 2 is a top plan view of the same. Fig. 3 is an enlarged side view of a portion of the same. Fig. 4 is a section taken transversely through one of the teeth, the section being on the line 4—4 of Fig. 3.

Like parts are represented by similar characters of reference throughout the several views.

In the said drawings, 1 represents the head of the rake which is formed from a single piece of sheet metal so stamped that there will be provided a series of comparatively long curved teeth 2 upon its lower edge. The head is also formed of a concavo-convex shape and to the inner concave surface thereof is attached a handle 3, the inner end of the handle being provided with a bifurcated portion 4 formed with projecting ears 5 which are riveted or otherwise secured to the head 1. In stamping the head, each of the teeth is so formed as to provide on the rear side thereof a rib 6 extending from the point of the tooth throughout the full length thereof and also well into the body of the head portion proper. By this construction, it will be seen that in the operation of the device, the rib 6 will form runners which ride along the ground and maintain the points of the teeth above the ground line and thus obviate any danger of the points of the teeth digging into the ground and uprooting the growing grass, as well as reducing friction between the tool and the ground. The heads of the weeds, such as the heads of dandelions, will be caught between the teeth and pulled off, thus effectively freeing the lawn from these weeds. The ribs also serve to strengthen the teeth and body to permit the device to be used for heavier work, such as raking leaves, cutting grass, and the like.

Having thus described my invention, I claim:

In a rake, a concaved body formed of sheet metal, said metal being stamped to form comparatively long curved teeth on its lower edge and also stamped to provide ribs on the rear side of each of said teeth, said ribs also extending into said body.

In testimony whereof, I have hereunto set my hand this 13th day of March 1914.

GEORGE E. TOWNSEND.

Witnesses:
CHAS. I. WELCH,
ESTHER E. PFEIFER.